United States Patent
Siewert (10) Patent No.: US 10,046,788 B2
(45) Date of Patent: Aug. 14, 2018

(54) STEERING COLUMN FOR A MOTOR VEHICLE

(71) Applicants: ThyssenKrupp Presta AG, Eschen (LI); ThyssenKrupp AG, Essen (DE)

(72) Inventor: Michael Siewert, Fläsch (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 73 days.

(21) Appl. No.: 15/122,243

(22) PCT Filed: Feb. 17, 2015

(86) PCT No.: PCT/EP2015/053348
§ 371 (c)(1),
(2) Date: Aug. 29, 2016

(87) PCT Pub. No.: WO2015/128228
PCT Pub. Date: Sep. 3, 2015

(65) Prior Publication Data
US 2016/0368521 A1 Dec. 22, 2016

(30) Foreign Application Priority Data
Feb. 28, 2014 (DE) .................. 10 2014 102 661

(51) Int. Cl.
*B62D 1/184* (2006.01)
*B62D 1/16* (2006.01)
(52) U.S. Cl.
CPC ............... *B62D 1/16* (2013.01); *B62D 1/184* (2013.01)
(58) Field of Classification Search
CPC .................................................. B62D 1/184
See application file for complete search history.

(56) References Cited

U.S. PATENT DOCUMENTS

| 1,655,138 A | 1/1928 | De Orlo |
| 2002/0171235 A1* | 11/2002 | Riefe ............... B62D 1/184 |
| | | 280/775 |

(Continued)

FOREIGN PATENT DOCUMENTS

| CN | 102421653 A | 4/2012 |
| DE | 102006056582 A1 | 6/2008 |

(Continued)

OTHER PUBLICATIONS

International Search Report for PCT/EP2015/053348 dated May 11, 2015 (dated May 19, 2015).
English Language Abstract for DE102006056582A1.

*Primary Examiner* — James A English
(74) *Attorney, Agent, or Firm* — thyssenkrupp North America, Inc.

(57) ABSTRACT

A steering column may comprise a body-side holder with two fastening elements that each comprise a fastening portion for fastening the fastening element to a vehicle and a holding portion for holding a casing unit supporting a steering spindle rotatably about an axis of rotation. The axis of rotation may be arranged between the two holding portions, and the fastening and holding portions may be integral with a connecting portion disposed integrally there between. The connecting portion may be connected to the fastening portion via a first line of intersection, and the connecting portion may be connected to the holding portion via a second line of intersection. The first and second lines of intersection can define an intermediate plane with a surface normal. The second line of intersection together with a fastening point of the holding portion to the casing unit define a holding plane with another surface normal. The first line of intersection together with a fastening point of the fastening portion to the chassis defines a fastening plane (Continued)

with yet another surface normal. The three surface normals may be arranged at an angle to one another.

18 Claims, 6 Drawing Sheets

(56) References Cited

U.S. PATENT DOCUMENTS

| | | | | |
|---|---|---|---|---|
| 2009/0229399 A1* | 9/2009 | Ozsoylu | ................ | B62D 1/184 |
| | | | | 74/493 |
| 2009/0282945 A1* | 11/2009 | Streng | .................... | B62D 1/184 |
| | | | | 74/493 |
| 2011/0036198 A1* | 2/2011 | Minamigata | ........... | B62D 1/184 |
| | | | | 74/493 |
| 2012/0080874 A1* | 4/2012 | Narita | .................... | B62D 1/184 |
| | | | | 280/777 |
| 2013/0199866 A1* | 8/2013 | Yamamoto | ............... | B62D 1/16 |
| | | | | 180/443 |

FOREIGN PATENT DOCUMENTS

| | | |
|---|---|---|
| EP | 2085291 A1 | 8/2009 |
| JP | S60113771 A | 1/1928 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/053348, filed Feb. 17, 2015, which claims priority to German Patent Application No. 10 2014 102 661.6 filed Feb. 28, 2014, the entire contents of both of which are incorporated herein by reference.

FIELD

The present disclosure relates steering columns that can be used primarily in motor vehicles.

BACKGROUND

Steering columns for motor vehicles, in which a steering spindle is mounted rotatably in a casing unit, are known, wherein the steering spindle serves for transmitting a steering torque from a steering wheel mounted on the steering spindle to a wheel to be steered. A mounting unit is provided for fastening the steering column to the chassis of the motor vehicle, said mounting unit being connected on one side to the chassis of the motor vehicle and on the other hand directly or indirectly to the casing unit.

The mounting unit of the steering column, which serves for fastening the steering column to the vehicle, can be formed in multiple parts. The structure of the mounting unit considerably influences the rigidity and the natural frequency at which the steering column vibrates upon application of traveling influences and driving vibrations. In order to achieve as high a natural frequency as possible and accordingly to keep vibrations and vibration influences unnoticeable for the respective driver, a steering column has to have as high a natural frequency as possible. Such a high natural frequency is achieved in that the mounting unit comprises both a stiff structure and comprises as little use of material as possible since the natural frequency of the entire steering column is dependent on the rigidity and on the mass thereof.

U.S. Pat. No. 1,655,138 A discloses a mounting unit in which there is an approximately right angled connection between adjacent side cheeks of the mounting unit and a connecting flange which is connectable to the vehicle. Said mounting unit has only little rigidity.

DE 10 2006 056 582 A1 discloses a steering column in which the mounting unit comprises at least one fastening element which comprises a side cheek on which the casing unit is held. The fastening element also comprises a fastening portion which is connectable to the chassis of the motor vehicle. First and second fastening tabs can be provided on the fastening portion, said fastening tabs each being arranged inclined by an angle in relation to the side cheek. Further structural features are known, such as, for example, the provision of beads and a deep-drawn edge, which provide increased rigidity of the mounting unit.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

That said, the present disclosure general concerns steering columns that can be used in motor vehicles. One example steering column may comprise a body-side holder having two fastening elements that each include a fastening portion for fastening the respective fastening element to the chassis of the motor vehicle and a holding portion for holding a casing unit supporting a steering spindle rotatably about an axis of rotation. Such steering columns can be produced in simplified form with little use of material Accordingly, a steering column for a motor vehicle is proposed, comprising a body-side holder comprising two fastening elements which each comprise a fastening portion for fastening the respective fastening element to the chassis of the motor vehicle and each comprise a holding portion for holding a casing unit supporting a steering spindle rotatably about an axis of rotation, wherein the axis of rotation is arranged between the two holding portions, and the respective fastening portion and the respective holding portion are formed integrally with each other. According to the invention, a connecting portion is arranged between the respective fastening portion and the respective holding portion, said connecting portion being formed integrally with the fastening portion and the holding portion, wherein the respective connecting portion is connected to the respective fastening portion via a first line of intersection, and the respective connecting portion is connected to the respective holding portion via a second line of intersection, and the first line of intersection and the second line of intersection define an intermediate plane with a surface normal, wherein the second line of intersection together with a fastening point of the holding portion to the casing unit defines a holding plane with a surface normal, and wherein the first line of intersection together with a fastening point of the fastening portion to the chassis defines a fastening plane with a surface normal, and the three surface normals are arranged at an angle to one another.

Since a connecting portion is arranged between the respective fastening portion and the respective holding portion, said connecting portion being formed integrally with the fastening portion and the holding portion, wherein the respective connecting portion is connected to the respective fastening portion via a first line of intersection and the respective connecting portion is connected to the respective holding portion via a second line of intersection, wherein said two lines of intersection define an intermediate plane with a surface normal, and wherein the second line of intersection together with a fastening point of the holding portion to the casing unit defines a holding plane with a surface normal, and wherein the first line of intersection together with a fastening point of the fastening portion to the chassis defines a fastening plane with a surface normal, wherein the three surface normals are arranged at an angle to one another, a particularly simple and stiff structure of the steering column is produced.

The fastening point of the holding portion to the casing unit is understood as meaning a point at which the casing unit is in contact with the holding portion and at which the two parts are connected to each other. In the case of a screw connection or rivet connection or a clamping connection with a clamping bolt, the fastening point should be understood as meaning the point on the area in the holding portion that is defined by the opening through which the screw or the bolt is guided, which point lies on the axis of the connecting element. It is immediately clear here that the casing unit may also comprise additional elements, such as, for example, a holding part, in order to facilitate the connection between the holding portion and the casing unit.

The fastening point of the fastening portion to the chassis should be understood as meaning either a point at which the chassis is in contact with the fastening portion and at which the two parts are connected to each other. In the case of a screw connection or rivet connection, the fastening point should be understood as meaning the point on the area in the fastening portion that is defined by the opening through which the screw or the rivet is guided, which point lies on the axis of the connecting element.

The single-piece fastening elements are manufactured from a single part and not from a plurality of parts which are combined by subsequent joining to form an assembly. In the simplest and preferred case, the two fastening elements are produced from a sheet-metal piece in a bending, pressing and punching operation.

Preferably, the steering spindle can transmit the steering movement from the steering wheel to the steerable wheel with the interconnection of a steering gear and particularly with the use of power assistance.

However, it is also possible for the steering movement to be sensed by the steering spindle sensorially, for example electrically, electronically or magnetically, and for the sensed signals to be fed into a control system which uses a device to pivot the steerable wheel to represent the steering movement. Systems of this type are known as steer-by-wire.

The rigidity of the steering column is preferably further increased by the fact that, at least in one of the two fastening elements, the first line of intersection and the second line of intersection meet in a region of intersection which lies within a defined spherical region having a diameter which is smaller than or equal to double the distance of the fastening points from each other, wherein the two fastening points likewise lie within the defined spherical region. In other words, it is preferred for the first line of intersection and the second line of intersection of at least one of the fastening elements to meet in a region of intersection which lies within a defined spherical region having a diameter which is smaller than or equal to double the distance of the fastening points from each other, wherein the two fastening points likewise lie within the defined spherical region.

A preferred further increase in the rigidity is achieved if at least in one of the two fastening elements, the first line of intersection and the second line of intersection meet in a region of intersection which is designed as an intersecting point or is arranged in a defined spherical region having a diameter, wherein the diameter is smaller than three times the material thickness of the material used for the fastening element, i.e. preferably the sheet-metal thickness of the sheet metal used in the pressing and punching operation. In other words, it is even more preferred if the first line of intersection and the second line of intersection of at least one of the fastening elements meet in a region of intersection which is designed as an intersecting point or is arranged in a defined spherical region having a diameter, wherein the diameter is smaller than three times the material thickness of the material used for the fastening element, i.e. preferably the sheet metal thickness of the sheet metal used in the pressing and punching operation.

Advantageously, in each case precisely one single connecting portion is formed between the respective fastening portion and the respective holding portion.

The production method is preferably substantially simplified if the respective connecting portion is substantially designed as a flat triangle, and both the holding portion and the fastening portion are angled in relation to the connecting portion. As a result of the fact that the holding portion is connected to the fastening portion via a flat connecting portion, the holding portion can be configured relative to the fastening portion in such a manner that increased rigidity of the fastening element results. The fastening element can thereby be formed in a stiffer manner and at the same time can be manufactured with less use of material. Owing to the fact that the connecting portion is of flat design, the production can be simplified even further and the fastening element can in particular also be produced by punching and bending a sheet-metal strip.

A "substantially" triangle structure is understood as meaning that the connecting portion comprises three sides which are present at angles. However, the sides do not have to intersect and directly form vertices of the respective triangles. On the contrary, material can also be absent in the region of the vertices and accordingly "blunt vertices" can be present. Similarly, at the borders with the fastening portion and holding portion, the connecting portion may comprise interruptions in the bent edges, and also material recesses.

If the vertex of the triangular connecting portion becomes the region of intersection of the respective first and second lines of intersection, a coupling of the holding portion to the fastening portion that is stiff and stable in all directions in space can be achieved. Accordingly, a rigidity which is formed similarly to connected U profiles can be obtained here.

The edge opposite the vertex of the connecting portion is preferably positioned in such a manner that the first and second lines of intersection run substantially directly through the force introduction regions or connecting regions. In this manner, depending on the available operative surfaces, an optimum can in each case be found from a short introduction of lever force at the respective lines of intersection and the maximally available material for the force introduction or guidance. By means of the combination of the junction of intersections, which is remote from the respective force introduction points, between the first line of intersection and the second line of intersection, and the direct force transmission between the respective force introduction points, torque fastening of the fastening portion to the holding portion is achieved and accordingly flexural rigidity is obtained.

In a preferred development of the invention, the solid angles between the lines of intersection are within a certain range of values. It has been shown that a stiff steering column structure is achieved if a solid angle α within the range from 45° to 85° is formed between the first line of intersection and the second line of intersection. The rigidity can be further increased if preferably the angle range is from 55° to 80°. However, it is even more preferable to form an angle range between the first and second lines of intersection of 65° to 75°, wherein the angle of 70° is entirely particularly preferred.

The fastening element can be produced particularly simply if the holding portion, the fastening portion and the connecting portion are designed as flat surfaces which may, however, comprise openings and interruptions. The fastening element can thus be simply bent from a flat sheet metal strip.

The simple geometry of the fastening element furthermore makes it possible to produce the fastening element as a punched and bent part from sheet metal having a constant material thickness, or else to produce same from a fiber composite material and accordingly to produce same with little use of material and with simple tools.

A further increase in the rigidity is produced if a reinforcing portion is arranged on that side of the fastening portion which faces away from the connecting portion, said reinforcing portion being angled with respect to said fastening portion, wherein a third line of intersection which intersects the region of intersection is formed along the bent edge between the fastening portion and the reinforcing portion.

An even further increase in the rigidity is produced if a guide portion is arranged on that side of the holding portion which faces away from the connecting portion, said guide portion being angled with respect to said holding portion, wherein a fourth line of intersection which intersects the region of intersection is formed along a bent edge between the guide portion and the holding portion.

In a further preferred embodiment, the holding planes of the first fastening element and of the second fastening element, between which the casing unit is held, are arranged parallel to each other. The first lines of intersection of the two fastening elements arranged in an installed position are in each case oriented with respect to one another at a solid angle of 60° to 120°. A solid angle within the range of 70° to 110° is preferably represented here. Angle ranges of 80° to 100° are particularly preferred, and an angle of 90° is very particularly preferred.

With reference now to the figures, those having ordinary skill in the art will understand that identical, similar, identically-acting, or like elements in the various figures are denoted with like reference signs.

FIGS. 1 to 4 show a steering column 1 in various illustrations. The steering column 1 comprises a casing unit 10 in which a steering spindle 12 is rotatably mounted. A steering wheel (not illustrated here) can be mounted at the steering wheel end 14 of the steering spindle 12, and therefore a steering torque introduced onto the steering wheel by a driver can be transmitted by means of the steering spindle 12 in a known manner to a wheel which is to be steered. The steering spindle 12 can transmit the steering movement here from the steering wheel to the steerable wheel with the interconnection of a steering gear, optionally with the aid of power assistance.

In a variant, the steering movement can also be sensed sensorially by the steering spindle 12, for example electrically, electronically or magnetically, and fed into a control system which, with the aid of a steering device, pivots the steerable wheel in order to produce the steering movement. Systems of this type are known as steer-by-wire.

A mounting unit 2 is provided which serves for fastening the casing unit 10 to a motor vehicle chassis (not shown here). Furthermore, a supporting unit 3 is provided which likewise serves for fastening the casing unit 10 to the motor vehicle chassis.

In the exemplary embodiment shown in FIGS. 1 to 4, the supporting unit 3 is provided with a bracket portion 30 which can be fastened rigidly to the motor vehicle chassis via corresponding fastening recesses 32. The supporting unit 3 is designed in such a manner that it holds the casing unit 10 so as to be pivotable about a horizontal pivot axis Y. The steering-wheel end 14 of the steering spindle 12 can therefore be raised or lowered about the horizontal pivot axis Y in order thereby to provide a height adjustment of the steering wheel. Via the height adjustment of the steering wheel, the steering column 1 and therefore the position of the steering wheel arranged at the steering-wheel end 14 of the steering spindle 12 can be correspondingly adapted to the respective sitting position of a driver in order to improve the ergonomics.

The mounting unit 2 comprises two fastening elements 4, 4' via which the casing unit 10 is fastened to a motor vehicle chassis. The casing unit 10 comprises a holding part 20, for producing the connection of the fastening elements 4, 4' to the casing unit 10. For this purpose, the fastening elements 4, 4' each have a holding portion 40 which, in the exemplary embodiment shown, is designed as a sheetlike, flat portion in the form of a side cheek. The casing unit 10 is held on the holding portion 40 of the fastening element 4, 4' via the holding part 20. The holding portions 40 extending on both sides of the casing unit 10 are oriented parallel to each other and hold the casing unit 10 between them. The casing unit 10 is secured here to the holding portion 40 at the fastening point 40b. The fastening point 40b here is the point at which the casing unit 10 is in contact with the holding portion 40 and at which the two parts are connected to each other. In the example here, the fastening point 40b lies on that area in the holding portion 40 which is spanned by the elongated hole 400, at the point which lies on the axis of the fixing bolt 22. In the case of a screw connection or rivet connection, as can be provided in nonadjustable steering columns, the fastening point is the point in the plane defined in the holding portion by the opening, which point lies on the axis of the screw or of the rivet. Alternatively, although less preferred, the fastening could also take place in a different manner, for example by welding, adhesive bonding or the like (also see FIG. 7). In this case, the fastening point is a point at which the casing unit is in contact with the holding portion 40 and at which the two parts are connected to each other.

The fastening elements 4, 4' furthermore each have a fastening portion 42 which serves for the rigid connection of the respective fastening element 4, 4' to the motor vehicle chassis. For this purpose, for example, fastening openings 420 are provided in the fastening portions 42, through which fastening openings the respective fastening element 4, 4' can be secured at defined fastening points 42b on the motor vehicle chassis via screws or bolts. The fastening point 42b here is the point on that area in the fastening portion which is defined by the opening, which point leads through the axis of the connecting element. In addition to screws or bolts, rivets are also possible as connecting elements. Alternatively, although less preferred, the fastening could also take place in another manner, for example by welding, adhesive bonding or the like. In this case, the fastening point is a point at which the chassis is in contact with the fastening portion 42 and at which the two parts are connected to each other.

The fastening portion 42 is angled with respect to the holding portion 40 and, in the exemplary embodiment shown, is present at an angle of 90°. The angle is intended here as the solid angle between the plane formed by the fastening portion 42 and the plane formed by the holding portion 40. However, the angle depends on the respective installation conditions in the motor vehicle, and therefore the present embodiments are not restricted to the angle mentioned of 90°. On the contrary, it should be understood as a boundary condition that the fastening portion 42 is intended to be fastened to a portion that is complementary thereto on the motor vehicle chassis and is correspondingly shaped. The holding portions 40 of the two fastening elements 4, 4' are customarily formed parallel to each other, but may also be arranged at different angles with respect to each other depending on the design of the casing unit 10.

In other words, the holding portion 40 and the fastening portion 42 are formed at an angle to each other in such a manner that the planes formed by the respective portions are substantially perpendicular to one another. However, any other orientations are also possible, depending on how the respective fastening portion 42 can be connected to the motor vehicle chassis and which orientation said fastening portion has in relation to the holding portion 40.

When two fastening elements 4, 4' are used for fastening the casing unit 10 to the motor vehicle chassis, each fastening element 4, 4 may have a different angle between the holding portion 40 and the fastening portion 42 depending on the structure of the chassis.

In order to permit the above-indicated height adjustment of the steering-wheel end 14 of the steering spindle 12, the casing unit 10 is held in a fixable and releasable manner between the holding portions 40 of the fastening elements 4, 4' by means of a fixing bolt 22. The fixing bolt 22 connects the holding portions 40 of the two fastening elements 4, 4' to each other, wherein the holding part 20 which is connected to the casing unit 10 lies inbetween and can be accordingly clamped to the fastening elements 4, 4' by means of the fixing bolt 22.

The fixing bolt 22 is formed via a mechanism which is known per se in such a manner that pivoting of a fixing lever 220 into a closed position results in the two holding portions 40 of the two fastening elements 4, 4' being clamped to each other and also to the holding part 20, and therefore also to the casing unit 10, in order to fix the casing unit 10 in a predetermined position relative to the fastening elements 4, 4'. However, if the fixing lever 220 is pivoted into an open position and therefore the fixing bolt 22 is released, the casing unit 10 can be pivoted upward or downward about the horizontal pivot axis Y.

In order to permit this pivoting, an elongate hole 400 is provided in the holding portion 40, said elongate hole permits an up and down movement of the fixing bolt 22 and therefore also the casing unit 10 which is connected to the latter via the holding part 20.

An elongate hole 200 is likewise provided in the holding part 20, said elongate hole extending in a direction formed substantially perpendicularly to the extent of the elongate hole 400 of the holding portion 40, and which ensures the corresponding equalization of length in the direction of the spindle axis X such that pivoting can take place about the horizontal pivot axis Y.

The fastening elements 4, 4' furthermore each have a connecting portion 44 which is formed between the holding portion 40 and the fastening portion 42. The connecting portion 44 therefore connects the holding portion 40 to the fastening portion 42.

Since the fastening portion 42 is angled with respect to the holding portion 40, the holding portion 40 and the fastening portion 42 are therefore also angled with respect to the connecting portion 44.

In the exemplary embodiment shown, the connecting portion 44 is formed as a flat portion and substantially has the shape of a flat triangle.

The connecting portion 44 together with the fastening portion 42 forms a first line of intersection a1 along the bent edge providing the angled portion. In the fastening element 4', a first line of intersection b1 is formed analogously along the bent edge between the holding portion 40 and the connecting portion 44. For reasons of simplicity, only the first fastening element 4 is described in detail below. However, this description applies equally to all of the fastening elements 4, 4' shown here.

Between the holding portion 40 and the connecting portion 44, a second line of intersection a2 is correspondingly formed along the bent edge providing the angled portion.

The first line of intersection a1 and the second line of intersection a2 intersect in a region of intersection A. The region of intersection A can be formed here as an intersecting point of the two lines of intersection a1, a2. The region of intersection A can coincide with the vertex of the connecting portion 44 designed as a flat triangle.

The holding portion 40, the fastening portion 42 and the connecting portion 44 are each designed here as flat surfaces.

In addition to the holding portion 40, the fastening portion 42 and the connecting portion 44, the fastening element 4 comprises further portions which permit a further improvement in the connecting properties. In the example shown, a reinforcing portion 46 is also provided which adjoins the fastening portion 42 and, in the exemplary embodiment shown, is formed by a crimped edge of the fastening portion 42. The reinforcing portion 46 is provided on a side of the fastening portion 42 that faces away from the connecting portion 44.

The reinforcing portion 46, along the bent edge with the fastening portion 42, forms a third line of intersection a3 which intersects the region of intersection A and which correspondingly meets in the region of intersection A with the first line of intersection a1 and the second line of intersection a2.

Furthermore, a guide portion 48 is provided which adjoins the holding portion 40. The guide portion 48 is provided on a side of the holding portion 40 that faces away from the connecting portion 44. The guide portion 48 is likewise arranged at an angle in relation to the holding portion 40, and therefore a fourth line of intersection a4 is formed along the bent edge. The fourth line of intersection a4 also runs through the region of intersection A and accordingly meets with the first line of intersection a1, the second line of intersection a2 and the third line of intersection a3 in the region of intersection A.

In addition to its design as an actual intersecting point, the region of intersection A can also be designed as a region within a defined spherical region having a diameter r, wherein the diameter r of the spherical region is preferably smaller than three times the material thickness s of the material forming the fastening element 4. The three or four lines of intersection a1, a2, a3 and a4 correspondingly meet in the region of intersection A in such a manner that the lines of intersection intersect, or are at least at a tangent to, the correspondingly defined sphere.

Figure 1:
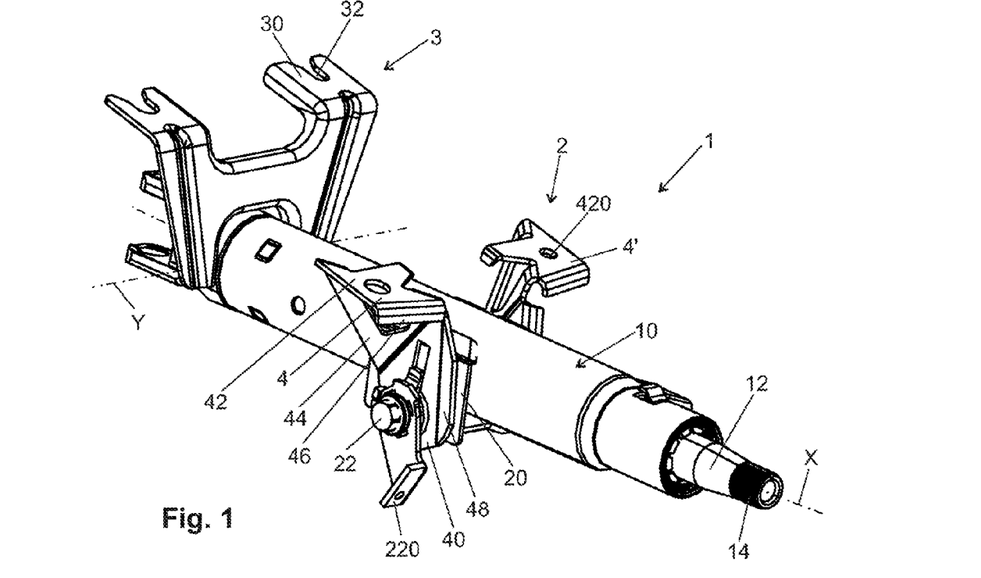
FIG. 1 is a schematic perspective view of an example steering column for a motor vehicle.
Figure 2:
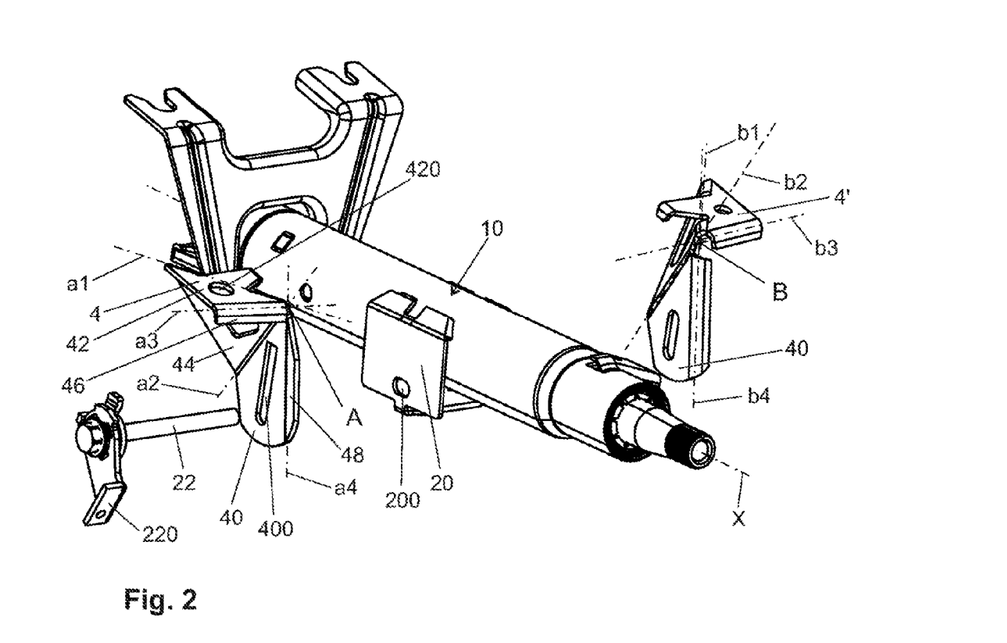
FIG. 2 is a partially exploded schematic perspective view of the example steering column of FIG. 1.
Figure 3:
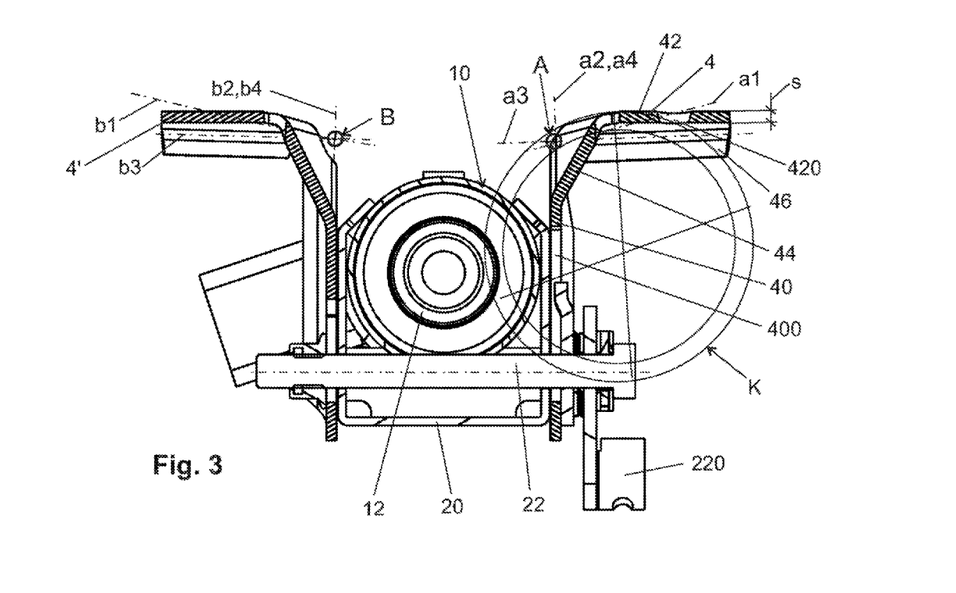
FIG. 3 is a cross-sectional view through the example steering column of FIG. 1.
Figure 4:
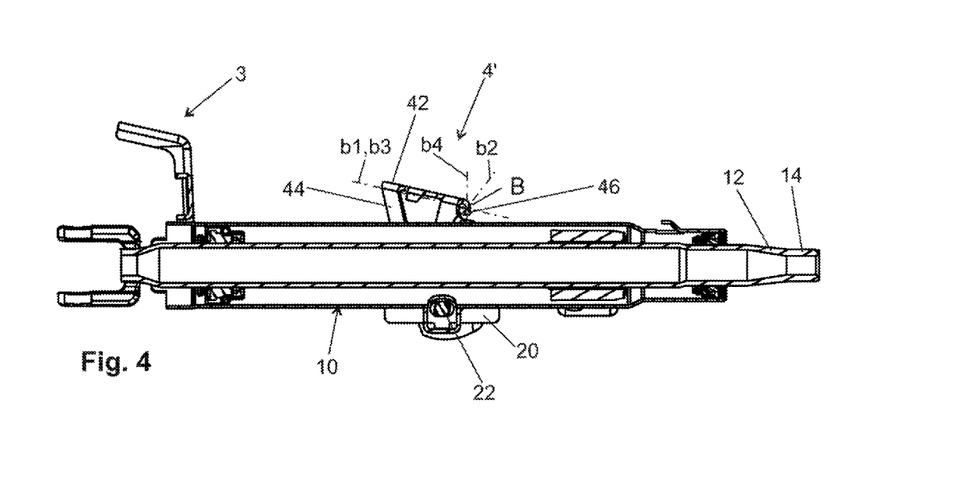
FIG. 4 is a longitudinal section view through the example steering column of FIG. 1.
Figure 5:
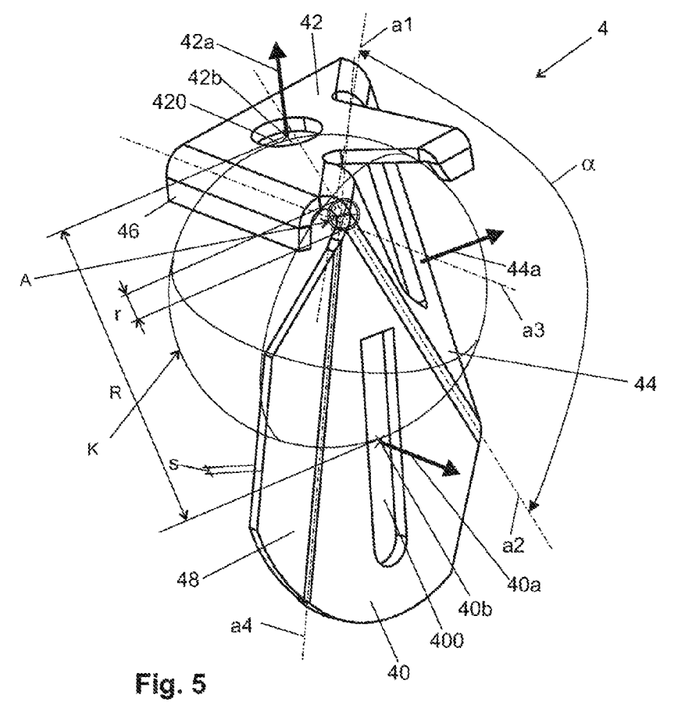
FIG. 5 is a schematic perspective view of an example fastening element for a steering column shown in a first orientation.
Figure 11:
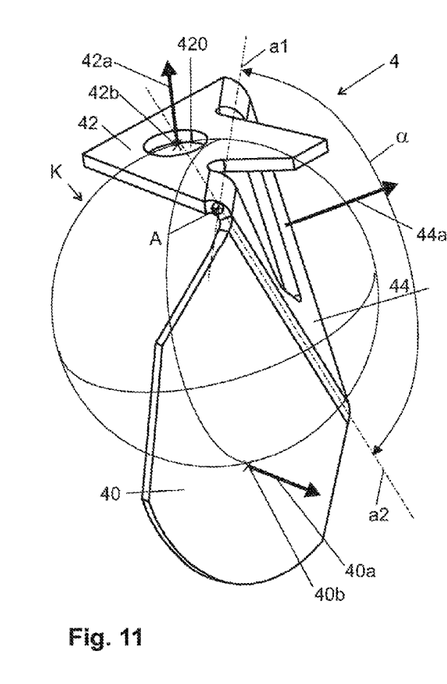
FIG. 11 is a schematic perspective view of another example fastening element for a steering column shown in a first orientation.

At the same time, the lines of intersection of a fastening element can lie within a second defined spherical region K, wherein, however, at the same time the fastening point 40b between casing unit 10 and holding portion 40 and at the same time the fastening point 42b between chassis and fastening portion 42 of the respective fastening element lie within or on the surface of the second spherical region K. The diameter R of the spherical region K is smaller than or equal to double the distance of the two fastening points 40b and 42b of the respective fastening element from each other. The lines of intersection of a respective fastening element preferably intersect the spherical region K, and the two fastening points 40b and 42b of the respective fastening element lie on the surface of the spherical region, wherein the diameter of the spherical region corresponds to the distance of the respective fastening points 40b and 42b from each other. This is illustrated in FIGS. 5 and 11.

By means of the shape of the first line of intersection a1 and the second line of intersection a2, which intersect in the region of intersection A, the effect which can be achieved because of the triangular surface of the connecting portion 44 that is formed in this manner, is that a concentration of the bent edges of the surfaces is correspondingly achieved in the region of intersection A. Accordingly, a force junction is also produced here which is spaced apart from the respective force introduction regions which are formed by the elongate hole 400 in the holding portion 40 and the fastening bore 420 in the fastening portion 42. Accordingly, by means of the geometrical configuration shown, increased rigidity of the fastening element 4 can be achieved although the fastening element 4 itself can be produced in a simple manner from a sheet metal strip.

Owing to the fact that a reinforcing portion 46 and a guide portion 48 are formed on the edges of the holding portion 40 and of the fastening portion 42 which lie opposite the connecting portion 44, rigidity can furthermore also be obtained for the fastening element 4, in particular also by the fact that the third line of intersection a3 and the fourth line of intersection a4 likewise meet in the region of intersection A which is arranged outside the force introduction regions.

The same considerations also apply with respect to the fastening element 4', wherein here the first line of intersection is provided with the reference sign b1, the second line of intersection is provided with the reference sign b2, the third line of intersection is provided with the reference sign b3 and the fourth line of intersection is provided with the reference sign b4, and a common region of intersection B is provided.

Figure 6:
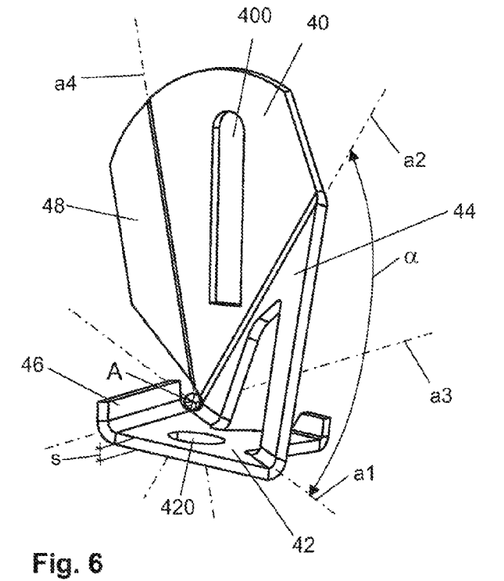
FIG. 6 is a schematic perspective view of the example fastening element of FIG. 5 shown in a second orientation.

FIGS. 5 and 6 show a fastening element 4 once again in an enlarged, separate illustration. It can be seen that the region of intersection A here is provided with the three-dimensional extent of a spherical region, which extent is intersected by the lines of intersection a1 to a4. The diameter r of the sphere is preferably smaller than three times the material thickness s of the material of the fastening element 4. The smaller the diameter of the region of intersection, the greater also is the rigidity of the fastening element. At the same time, FIG. 5 also illustrates the spherical region K, with its diameter R.

As can be seen from FIGS. 5 and 6, the fastening element 4 can be produced by pure punching and bending processes of a corresponding sheet metal strip with a constant material thickness s, and therefore the fastening element 4 of the mounting unit 2 can be produced with little use of material and in a simple manner with simple tools.

A particularly preferred and stable geometry is produced for a solid angle α between the first lines of intersection a1 and the second lines of intersection a2 within an angle range of 45° to 85°, preferably of 55° to 80°, particularly preferably of 65° to 75°, and ideally of 70°.

The region of intersection A is particularly preferably located in the region of the vertex of the connecting portion 44 designed as a triangle and very particularly preferably coincides with the vertex thereof. However, the region of intersection A may also lie outside the material from which the fastening element 4 is produced, in particular if, for example, a material recess is formed in the region of the vertex of the connecting portion 44 in order to simplify the respective bending and punching processes and to prevent obstructions during the bending.

The connecting portion 44 is preferably defined as a flat triangle, on the vertex of which the respective region of intersection A lies. The connecting portion 44 is preferably designed as a flat isosceles triangle.

By means of the proposed geometry of the fastening element 4, reinforcing, three-dimensional pockets can be omitted, and flat surfaces can be used in each case for the respective portions, in particular the holding portion 40, the fastening portion 42, the connecting portion 44, the reinforcing portion 46 and the guide portion 48. Owing to the fact that no three-dimensional pockets are provided, it is also possible, for example, for punching oil to easily drain from the components without retrospective cleaning steps being necessary before the respective fastening element 4 is installed.

The fastening element 4 can therefore be produced in a simple manner from a substantially rectangular basic shape of sheet metal, primarily by punching and bending steps. In none of the bending steps does the bending necessarily have to be at right angles or even to a point, and therefore each of the bent edges which extend along the lines of intersection a1 to a4 can be bent in an individual working step. Deep-drawing is likewise unnecessary, and therefore the production costs can be correspondingly reduced.

At functionally irrelevant component edges, a radius can thus be formed centrally around the force- or form-fitting force introduction regions, and therefore force effects during the handling and during the transport of the respective assembly cannot result in distortions of the respective fastening elements, and therefore the transport safety and the transport robustness can be improved overall. Accordingly, in the event of impacts against the respective edges, a central introduction into the respective connecting point always takes place, and therefore rotation of the fastening element does not take place.

Figure 7:
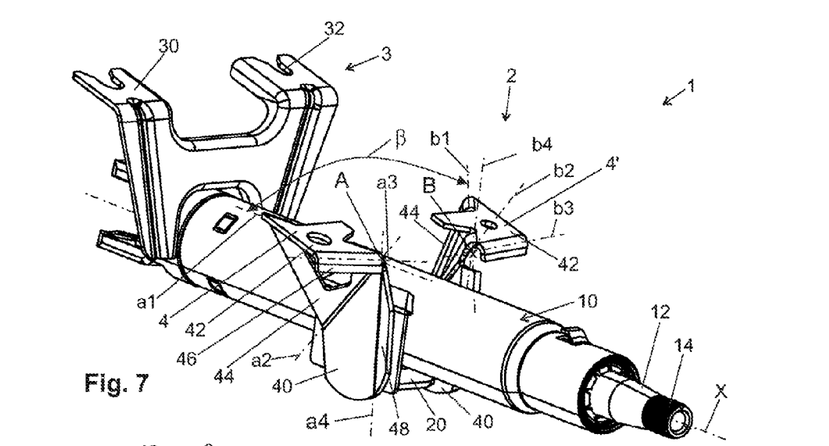
FIG. 7 is a schematic perspective view of another example steering column for a motor vehicle.

FIG. 7 shows a steering column 1 in a further embodiment, wherein the fastening element 4 and the fastening element 4' are constructed in terms of their structure in a manner as in the previous figures. In the exemplary embodiment shown in FIG. 7, a steering column 1 is illustrated, the casing unit 10 of which, and in association therewith, the steering spindle 12, is not designed to be adjustable. It can be seen from FIG. 7 that the mounting unit 2 here provides two fastening elements 4, 4', the holding portions 40 of which are arranged substantially parallel to each other and are connected to the holding part 20.

The first line of intersection a1 along the bent edge between the fastening portion 42 and the connecting portion 44 of the fastening element 4 arranged on the left side, and the first line of intersection b1 along the bent edge between the fastening portion 42 and the connecting portion 44 of the fastening element 4' arranged on the right side, are preferably formed here at a solid angle β of between 60° and 120°, preferably between 70° and 110°, particularly preferably between 80° and 100°, and ideally of 90°.

Since the two fastening elements 4, 4' are coupled to each other in a force- and form-fitting manner via a central component in the form of the holding part 20 and the casing unit 10, the entire mounting unit 2 is highly spatially fixed and accordingly has high rigidity against the application of forces and of torques. Accordingly, it is possible to provide radial and axial rigidity and also torsional rigidity which meets the requirements of a steering column 1. Furthermore, a steering column having a high natural frequency can also be provided on the basis of the high rigidity of the fastening elements 4, 4' because of the reduced use of material during the production of the fastening elements 4, 4'.

Figure 8:
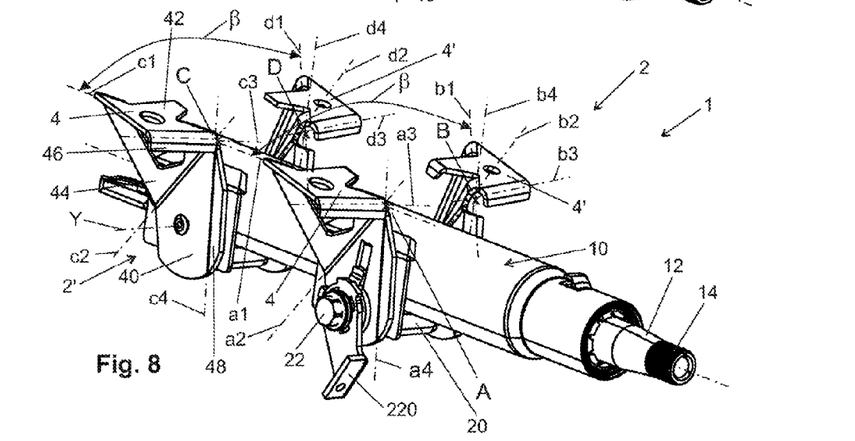
FIG. 8 is a schematic perspective view of still another example steering column for a motor vehicle.

FIG. 8 schematically shows a further steering column 1 in which a second mounting unit 2' is provided which likewise has fastening elements 4, 4' which have a structure which corresponds to the structure of the fastening elements in FIG. 7. Accordingly, a connection of the casing unit 10 so as to be pivotable about a horizontal pivot axis Y via two fastening elements 4, 4' is illustrated in the rear region of the steering column 1. In the front region, a connection of the casing unit 10 is provided via the second mounting unit in which the pivot axis Y is formed.

The front mounting unit 2 which is directed toward the steering-wheel end 14 of the steering spindle 12 of the casing unit 10 is designed in the manner as shown in FIGS. 1 to 4, namely as a mounting unit which has fastening elements 4, 4' which permit a height adjustment of the casing unit 10.

In FIG. 8, first to fourth lines of intersection c1 to c4 of the fastening element 4 of the second mounting unit 2' are provided, which meet in a region of intersection C. Furthermore, the fastening element 4' of the second mounting unit 2' is provided with first to fourth lines of intersection d1 to d4, which likewise meet in a region of intersection D.

The first lines of intersection c1, d1 of the fastening elements 4, 4' are in turn preferably arranged at a solid angle β of 60° to 120°, preferably 70° to 110°, particularly preferably 80° to 100°, and ideally of 90°, in order to provide particularly high rigidity.

Figure 9:
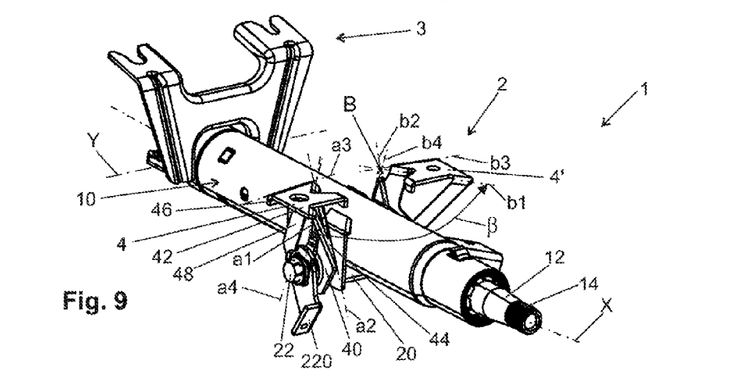
FIG. 9 is a schematic perspective view of yet another example steering column for a motor vehicle.

FIG. 9 shows yet another steering column 1 which in turn in its rear region comprises a support unit 3 which permits the casing unit 10 to be connected in the manner already described above to a motor vehicle chassis. A mounting unit 2 is provided which in turn permits a height adjustment of the casing unit 10 by means of pivoting by the horizontal pivot axis Y provided in the supporting unit 3.

The fastening elements 4, 4' in this form are likewise designed in the manner as, for example, in FIGS. 1 to 4, but are reversed in their orientation. In other words, the solid angle β between the first lines of intersection a1 of the first fastening element 4 and the first lines of intersection b1 of the second fastening element 4' is now provided at the end facing the steering-wheel end 14 of the spindle 12.

In all of the exemplary embodiments shown, the two fastening elements 4, 4' are mirrored on a plane placed through the surface of the holding portions 40. Accordingly, a symmetrical fastening of the casing unit 10 to the motor vehicle chassis can be achieved.

Figure 10:
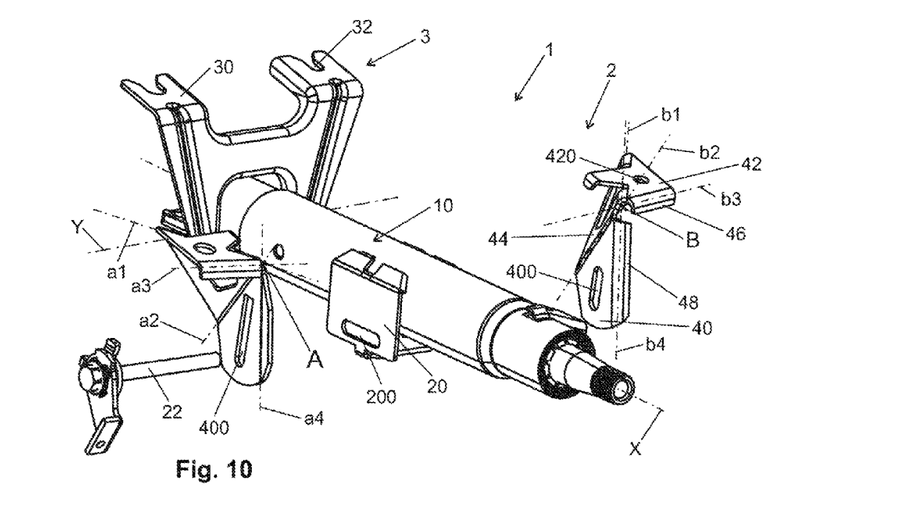
FIG. 10 is a partially exploded schematic perspective view of an example steering column.

FIG. 10 shows yet another steering column 1 which comprises a supporting unit 3 and which comprises a structure which substantially corresponds to the steering column shown in FIGS. 1 to 4. In addition to the possible height adjustment by pivoting about the horizontal pivot axis Y along the elongate hole 400, the casing unit 10 can also be displaced in the direction of the spindle axis X and accordingly a length adjustment of the steering wheel position can be achieved in this manner. For this purpose, the elongate hole 200 is correspondingly formed in the holding part 20 in an extended manner such that a displacement or adjustment of the casing unit 10 in relation to the fixing bolt 22, which is stationary in the direction of the spindle axis X, can be achieved.

Figure 12:
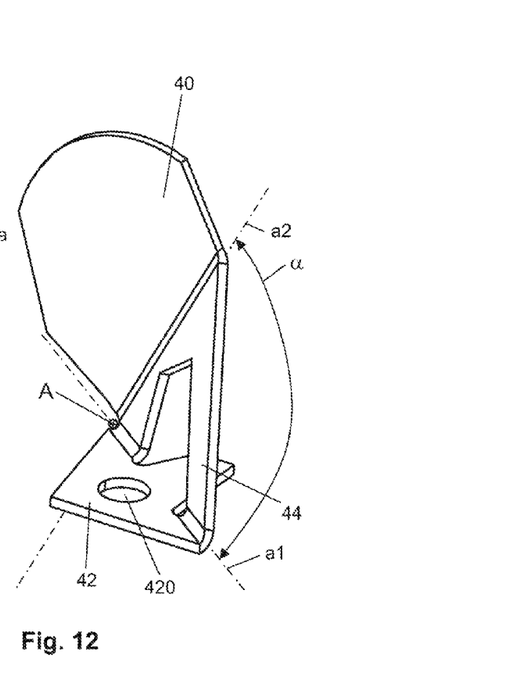
FIG. 12 is a schematic perspective view of the example fastening element of FIG. 11 shown in a second orientation.

FIGS. 11 and 12 show a further fastening element 4 which comprises a somewhat simpler structure than the fastening elements 4 shown in the previous exemplary embodiments. In particular, the fastening element 4 here comprises only a holding portion 40, a fastening portion 42 and a connecting portion 44, which are each designed as flat surfaces. Further surfaces are not provided.

The fastening element accordingly only has the three surfaces mentioned which are each arranged at an angle to one another. The connecting portion 44 is in turn of substantially triangular design. The first line of intersection a1, which extends along a bent edge between the fastening portion 42 and the connecting portion 44, and the second line of intersection a2, which extends a bent edge between the holding portion 40 and the connecting portion 44, meet in turn in a region of intersection A which lies in the spherical region K.

Also in this exemplary embodiment, the solid angle α between the first lines of intersection a1 and the second lines of intersection a2 is preferably between 45° and 85°, preferably between 55° and 80°, particularly preferably between 65° and 75°, and ideally 70°.

It is immediately apparent from FIGS. 11 and 12 that the fastening element 4 can be produced in a particularly simple manner, namely by provision of flat sheet metal which can be brought into the shape shown in FIGS. 11 and 12 by simple punching and bending processes. Since the bending processes do not require any acute-angled edges, the respective bending process can also be carried out directly in a single step.

By means of the correspondingly simple design of the geometry of the fastening elements of the mounting unit, the fastening elements can be formed with continuously flat surfaces, apart from in the region of the respective bent edges. This achieves an even simpler production of the fastening elements.

Figures 13, 14:
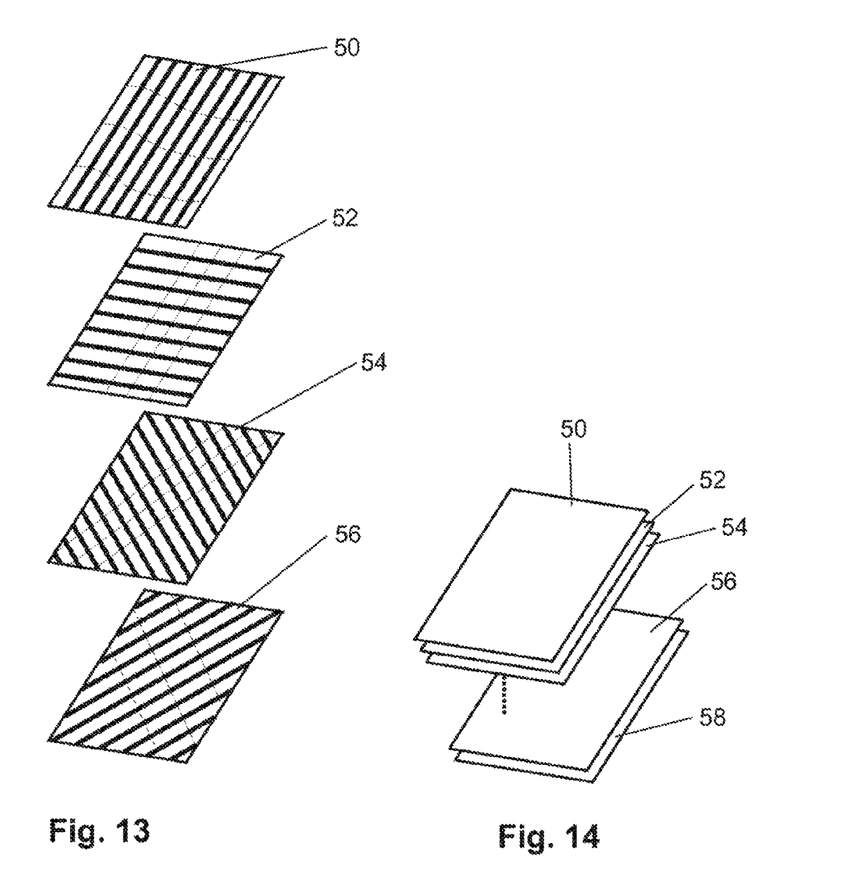
FIG. 13 is a schematic view of an example scrim with example fiber mats that can be used to form a fiber composite part.
FIG. 14 is a schematic view of another example scrim with example fiber mats that can be used to form a fiber composite part.
Figure 15:
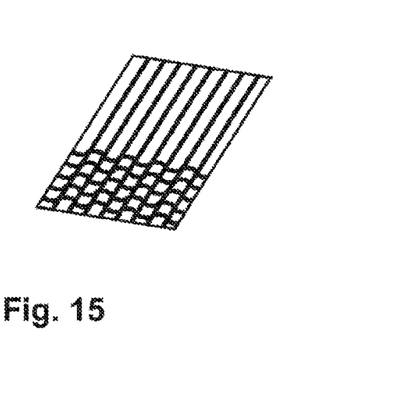
FIG. 15 is a schematic view of still another example scrim with example fiber mats that can be used to form a fiber composite part.

Owing to the simple design as sheetlike elements, the fastening elements can also be produced from a fiber composite material. FIGS. 13 to 15 show a corresponding scrim which can be used for forming such a fiber composite part.

The scrim comprises fiber mats 50 to 58 which have a preferred direction of the respective fibers.

In particular, the fiber direction of the respective fiber mats 50 to 58 is particularly preferably oriented in such a form that the fibers run substantially orthogonally or else with a small angle deviation with respect to the respective bent edges which correspond to the respective lines of intersection a1, a2, a3, a4 in the exemplary embodiments. A paired arranged of the respective fiber mats 50 to 58 is preferably provided here for each direction of extent.

If usable, all of the individual features which are illustrated in the individual exemplary embodiments can be combined with and/or interchanged for one another without departing from the scope of the invention.

What is claimed is:

1. A steering column for a motor vehicle, the steering column comprising:
    a body-side holder that includes two fastening elements, each fastening element comprising:
        a fastening portion for fastening the fastening element to a chassis of the motor vehicle,
        a holding portion for holding a casing unit supporting a steering spindle rotatably about an axis of rotation, wherein the holding portion is integral with the fastening portion, wherein the axis of rotation is positioned between the two holding portions of the two fastening elements, and
        a connecting portion positioned between the fastening portion and the holding portion, with the connecting portion being integral to the fastening portion and the holding portion,
    wherein the connecting portion is connected to the fastening portion via a first line of intersection, wherein the connecting portion is connected to the holding portion via a second line of intersection, wherein the first line of intersection and the second line of intersection define an intermediate plane with a surface normal,
    wherein the second line of intersection together with a fastening point of the holding portion to the casing unit defines a holding plane with a surface normal,
    wherein the first line of intersection together with a fastening point of the fastening portion to the chassis defines a fastening plane with a surface normal,
    wherein the three surface normals are disposed at an angle to one another,
    wherein at least one of the two fastening elements, the first line of intersection, and the second line of intersection meet in a region of intersection that serves as an intersecting point or is arranged in a defined spherical region having a diameter, wherein the diameter is smaller than three times a material thickness of a material used for the fastening element.

2. The steering column of claim 1 wherein the first line of intersection and the second line of intersection of at least one of the two fastening elements meet in a region of intersection that lies within a defined spherical region having a diameter that is smaller than or equal to double a distance between the fastening points, wherein the fastening points lie within the defined spherical region.

3. The steering column of claim 1 wherein each fastening element includes exactly one connecting portion between the fastening portion and the holding portion.

4. The steering column of claim 1 wherein the connecting portion of each fastening element is configured substantially in a shape of a flat triangle, wherein both the holding portion and the fastening portion of each fastening element are angled relative to the connecting portion.

5. The steering column of claim 1 wherein an angle between the first and second lines of intersection is 45-85 degrees.

6. The steering column of claim 1 wherein in at least one of the fastening elements the holding portion, the fastening portion, and the connecting portion are configured as flat surfaces.

7. The steering column of claim 1 wherein at least one of the fastening elements is produced as a punched and bent part from sheet metal having a constant material thickness or as a fiber composite material.

8. The steering column of claim 1 further comprising a guide portion disposed on at least one of the two fastening elements on a side of the holding portion that faces away from the connecting portion, wherein the guide portion is angled with respect to the holding portion, wherein a fourth line of intersection is formed along a bending edge between the guide portion and the holding portion, with the fourth line of intersection intersecting a region of intersection with the first line of intersection and the second line of intersection.

9. The steering column of claim 1 further comprising a reinforcing portion positioned on at least one of the two fastening elements on a side of the fastening portion that faces away from the connecting portion, the reinforcing portion being angled with respect to the fastening portion, wherein a third line of intersection is formed along a bending edge between the fastening portion and the reinforcing portion, with the line of intersection intersecting a region of intersection with the first line of intersection and the second line of intersection.

10. A steering column for a motor vehicle, the steering column comprising:
    a body-side holder that includes two fastening elements, each fastening element comprising:
        a fastening portion for fastening the fastening element to a chassis of the motor vehicle,
        a holding portion for holding a casing unit supporting a steering spindle rotatably about an axis of rotation, wherein the holding portion is integral with the fastening portion, wherein the axis of rotation is positioned between the two holding portions of the two fastening elements, and
        a connecting portion positioned between the fastening portion and the holding portion, with the connecting portion being integral to the fastening portion and the holding portion,
    wherein the connecting portion is connected to the fastening portion via a first line of intersection, wherein the connecting portion is connected to the holding portion via a second line of intersection, wherein the first line of intersection and the second line of intersection define an intermediate plane with a surface normal,
    wherein the second line of intersection together with a fastening point of the holding portion to the casing unit defines a holding plane with a surface normal,
    wherein the first line of intersection together with a fastening point of the fastening portion to the chassis defines a fastening plane with a surface normal,
    wherein the three surface normals are disposed at an angle to one another,
    wherein the holding portions of the first and second fastening elements, between which the casing unit is held, are arranged parallel to each other, wherein the first lines of intersection of the fastening elements once installed are oriented with respect to one another at an angle of 60-120 degrees.

11. The steering column of claim 10 wherein the first line of intersection and the second line of intersection of at least one of the two fastening elements meet in a region of intersection that lies within a defined spherical region having a diameter that is smaller than or equal to double a distance between the fastening points, wherein the fastening points lie within the defined spherical region.

12. The steering column of claim 10 wherein each fastening element includes exactly one connecting portion between the fastening portion and the holding portion.

13. The steering column of claim 10 wherein the connecting portion of each fastening element is configured substantially in a shape of a flat triangle, wherein both the holding portion and the fastening portion of each fastening element are angled relative to the connecting portion.

14. The steering column of claim 10 wherein an angle between the first and second lines of intersection is 45-85 degrees.

15. The steering column of claim 10 wherein in at least one of the fastening elements the holding portion, the fastening portion, and the connecting portion are configured as flat surfaces.

16. The steering column of claim 10 wherein at least one of the fastening elements is produced as a punched and bent part from sheet metal having a constant material thickness or as a fiber composite material.

17. The steering column of claim 10 further comprising a guide portion disposed on at least one of the two fastening elements on a side of the holding portion that faces away from the connecting portion, wherein the guide portion is angled with respect to the holding portion, wherein a fourth line of intersection is formed along a bending edge between the guide portion and the holding portion, with the fourth line of intersection intersecting a region of intersection with the first line of intersection and the second line of intersection.

18. The steering column of claim 10 further comprising a reinforcing portion positioned on at least one of the two fastening elements on a side of the fastening portion that faces away from the connecting portion, the reinforcing portion being angled with respect to the fastening portion, wherein a third line of intersection is formed along a bending edge between the fastening portion and the reinforcing portion, with the line of intersection intersecting a region of intersection with the first line of intersection and the second line of intersection.

\* \* \* \* \*